March 29, 1932.  B. A. VAN WORMER  1,851,880

WHEEL

Filed May 22, 1929

INVENTOR.
B. A. Van Wormer,
BY
Geo. P. Kimmel.
ATTORNEY.

Patented Mar. 29, 1932

1,851,880

UNITED STATES PATENT OFFICE

BERNARD A. VAN WORMER, OF LA GRANDE, OREGON

WHEEL

Application filed May 22, 1929. Serial No. 365,209.

This invention relates to a wheel particularly adapted for use in connection with saw mill carriages.

As is well known, the inner rails of saw mill carriage tracks are subjected to dirt, grit, bark, saw dust, and the like while the outer rails of the track are maintained comparatively clear.

In the ordinary construction of saw mill carriages and wheels, the wheels are fixedly secured to the axles to rotate therewith and in the operation of the carriage, the inner rails and wheels are subjected to greater wear than the outer rails and wheels with the result that the inner wheels soon become worn to such an extent that they no longer have the same diameter as the outer wheels. As the difference in diameter of the wheels increases, the amount of wear correspondingly increases and more power is required to propel the carriage in order to maintain the speed of the latter constant. At the same time, the rails are worn unevenly and periodical closing of the mill becomes necessary to make repairs to the wheels and rails.

My invention resides in a new and improved wheel adapted to be substituted for the usual solid wheel operating on either the inner or outer rail and has for its primary object to provide, in a manner as hereinafter set forth, a wheel of such class, by means of which the unevenness in the wear of the wheels and rails may be materially reduced, with a corresponding reduction in the expense of propelling the carriage and of maintaining the wheels and track in repair.

A further object of the invention is to provide a wheel of the class above mentioned, which is provided with a demountable tire, thereby permitting the replacement of the tire when the latter becomes worn after excessive use, without discarding the wheel as a unit.

With the foregoing and other objects in view, the invention consists of the novel construction, combination and arrangement of parts as hereinafter more particularly described, and as illustrated in the accompanying drawings wherein are shown several embodiments of the invention, but it is to be understood that the description and drawings are to be taken as illustrative and that the invention is intended to be limited only by the scope of the claim hereunto appended.

In the accompanying drawings, in which like numerals are employed to designate like parts throughout the same:

Figure 1:
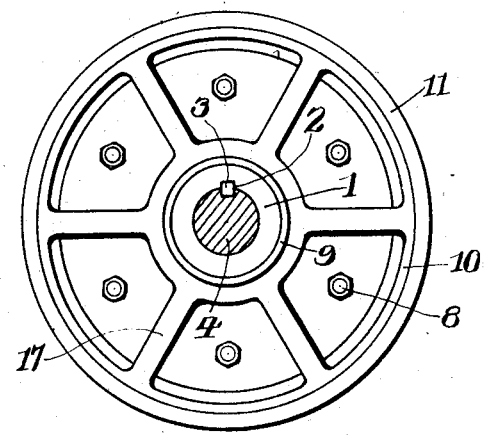
Figure 1 is a side elevation of a wheel constructed in accordance with this invention.
Figure 2:
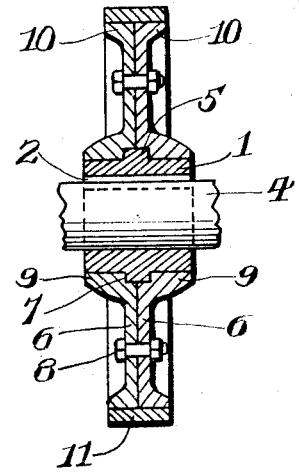
Figure 2 is a transverse section therethrough.

Referring to the drawings in detail, with particular reference to Figures 1 and 2, the numeral 1 indicates a cylindrical hub formed in its inner periphery with a longitudinally extending keyway 2 for the reception therein of a key 3, by means of which the hub 1 may be keyed to an axle 4 to rotate therewith. Midway between the ends thereof, the hub 1 is provided on its outer periphery with a circumferentially extending rib 5, preferably of rectangular form in cross section.

Rotatably mounted on the hub 1 is a pair of complementary wheel sections 6, each of which is substantially in the form of an annular disc having a recess 7 opening into its inner face and inner periphery. The sections 6 are secured together with their inner faces in contacting relation, in which position the opposed recesses 7 provide a key-way for the rib 5 for maintaining the sections on the hub 1. A plurality of bolts 8 are employed for securing the sections together.

Each of the sections 6 is formed adjacent its inner periphery with an outwardly projecting flange 9 and adjacent its outer periphery with an outwardly directed flange 10. With the sections in assembled relation on the hub 1, the free edges of the flanges 9 are flush with the ends of the hub 1 and constitute a fixed hub for the sections. The flanges 10 are of materially less length than the flanges 9 and constitute a felloe for the sections, upon which is mounted a demountable tire 11. The sections are also provided on their outer faces with spaced, radially extending spokes 17, the respective ends of which merge into the flanges 9 and 10.

Figure 3:
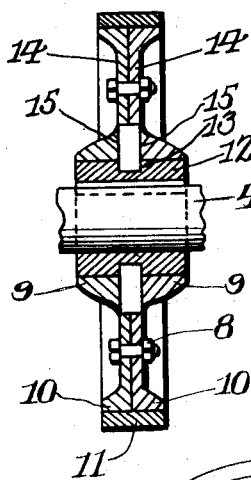
Figure 3 is a transverse section through a modified form of wheel.

Referring to Figure 3 of the drawings, the hub 12 is provided in its outer periphery, midway between its ends, with a circumferentially extending groove 13, preferably rectangular in cross section. The complementary sections 14 are formed with a plurality of spaced, registering recesses 15, which open into the inner faces and inner peripheries of the sections for the reception therein of a plurality of dowel pins 16, the inner ends of which project into the groove 13 for maintaining the sections 14 on the hub 12. The sections 14 are secured together by means of bolts 8 and are provided with flanges 9 and 10 and a tire 11 in the same manner as above described in connection with the embodiment illustrated in Figures 1 and 2.

Figure 4:
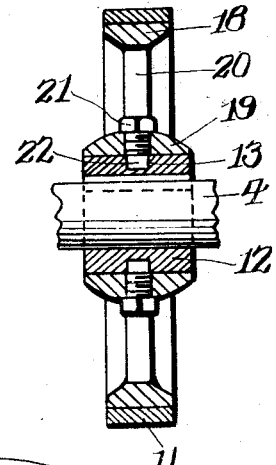
Figure 4 is a transverse section through a further modified form of wheel.

In the embodiment illustrated in Figure 4, the wheel body is formed as a unit and consists of a felloe 18, a hub 19, and a plurality of spaced spokes 20 extending radially of the wheel body and connecting the felloe 18 and hub 19. Between the inner ends of the spokes 20, the hub 19 is provided with a plurality of radially extending faces for threaded engagement with screws 21 extending therethrough, the inner end portions 22 of which are smooth and extend into the groove 13 of the hub 12, which is of the same construction as the hub 12 heretofore described in connection with Figure 3. The felloe 18 is provided with a tire 11 in the same manner as the embodiments illustrated in Figures 2 and 3.

Figure 5:
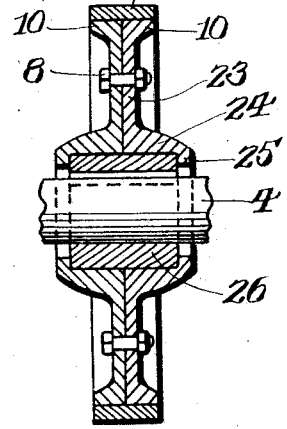
Figure 5 is a transverse section through a still further modified form of wheel.

In the modification shown in Figure 5, the wheel body is formed of a pair of complementary sections 23 secured together by means of bolts 8. Each of the sections 23 is formed adjacent its inner periphery with an outwardly directed flange 24, the outer end portion 25 of which is turned inwardly at a right angle. The sections 23 are rotatably mounted on a hub 26 and are maintained thereon by means of the inturned portions 25 of the flanges 24, the end faces of the hub 26 being overlapped by the portions 25. The sections 23 are provided adjacent their outer peripheries with outwardly directed flanges 10 which constitute a felloe for mounting a tire 11.

Figure 6:
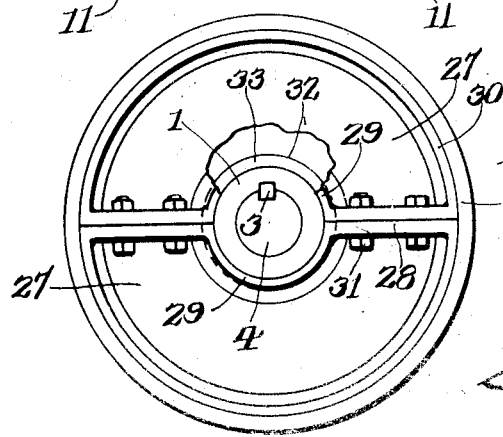
Figure 6 is a side elevation of a still further modified form of wheel.

In the embodiment shown in Figure 6, the wheel body is formed of a pair of complementary section 27, each of which is substantially in the form of a semi-annulus, thereby forming a wheel body which is annular in form when the sections are in assembled relation. Adjacent the contacting faces of the sections 27, each of the latter is formed with a pair of flanges 28 which project laterally from a side face of the section and the outer and inner ends respectively of which merge into arcuate flanges 29 and 30. The flanges 28 of the opposing sections 27 are disposed in opposed relation and are adapted to have extended therethrough a plurality of bolts 31 for securing the sections together. Each of the sections is formed in its inner, arcuate face with a groove 32 for the reception therein of a rib 33 on the rotatable hub 1 which is keyed to the shaft 4 by means of a key 3. The flanges 29 constitute a fixed hub for the sections 27 when the latter are in assembled relation and the flanges 30 constitute a felloe, upon which is mounted a tire 11.

In the several embodiments shown, the tire 11 may be secured to the felloe of the wheel body in any suitable manner, such as by shrinking, clamping, bolting, doweling, keying or the like, so long as the tire is removably secured in position. In the present instance the tire is shown as it would appear when shrunk on the felloe.

It is thought that the many advantages of a wheel in accordance with this invention will be readily apparent, and although the wheel will preferably be constructed in accordance with one of the embodiments herein shown and described, it is to be understood that various changes in the size, shape and arrangement of parts may be resorted to, so long as such changes fall within the scope of the invention as defined in the appended claim.

What I claim is:—

A wheel body comprising, a hub for mounting on an axle to rotate therewith, said hub having its outer peripheral face formed with a circumferentially extending groove, an annular wheel body formed of a pair of complementary sections and having its inner peripheral face rotatably mounted on the outer peripheral face of the hub, said sections being disposed with their inner radial faces in abutment, said inner radial faces having oppositely disposed recesses registering with the groove in the hub and arranged in spaced pairs circumferentially of the hub, a dowel pin disposed within each pair of recesses and having its inner end projecting into the groove in the hub, and means for securing said sections in abutting relation.

In testimony whereof, I affix my signature hereto.

BERNARD A. VAN WORMER.